United States Patent [19]
Klees

[11] Patent Number: 5,826,424
[45] Date of Patent: Oct. 27, 1998

[54] TURBINE BYPASS ENGINES

[76] Inventor: Garry W. Klees, 7515 SE. 76th St., Mercer Island, Wash. 98040

[21] Appl. No.: 869,622

[22] Filed: Apr. 16, 1992

[51] Int. Cl.⁶ ........................................................ F02K 3/02
[52] U.S. Cl. ............................................... 60/262; 415/9.4
[58] Field of Search ................................... 60/226.1, 262, 60/263, 224, 225; 415/914

[56] References Cited

U.S. PATENT DOCUMENTS

| | | | |
|---|---|---|---|
| 2,703,477 | 3/1955 | Anixonnaz | 60/262 |
| 2,720,356 | 10/1955 | Erwin | 415/115 |
| 2,848,155 | 8/1958 | Hausmann | 415/115 |
| 3,049,869 | 8/1962 | Grenoble | 60/262 |
| 3,340,690 | 9/1967 | Norman | 60/262 |
| 3,508,403 | 4/1970 | Neitzel | 60/226 |
| 3,514,955 | 6/1970 | Paulson et al. | 60/262 |
| 3,528,250 | 9/1970 | Johnson | 60/261 |
| 3,900,177 | 8/1975 | Calder | 60/226.1 |
| 4,287,715 | 9/1981 | Klees | 60/226 |
| 4,294,068 | 10/1981 | Klees | 60/262 |
| 4,306,412 | 12/1981 | Klees | 60/226 R |
| 4,435,958 | 3/1984 | Klees | 60/226.1 |
| 4,448,019 | 5/1984 | Klees | 60/226 R |

*Primary Examiner*—Michael J. Carone
*Attorney, Agent, or Firm*—John C. Hammar

[57] ABSTRACT

A supersonic aircraft engine, either turbojet or turbofan, having a compressor, a diffuser, a combustion chamber, a turbine, and a nozzle passageway, and a turbine bypass passageway for bypassing compressor exit flow around the turbine. The bypass passageway comprises a plurality of supply pipes, and a flow control valve is mounted in each of the plurality of supply pipes. Under given flight conditions, a predetermined number of these flow control valves are fully closed, while the remaining flow control valves are opened as necessary for the given flight condition to obtain a desired rate of turbine bypass flow. The turbine bypass flow is supersonically mixed with the turbine exit flow during transonic acceleration or discharged externally of the engine housing. The turbine bypass flow is primarily composed of boundary layer air flowing along the inner and outer walls of the diffuser.

14 Claims, 4 Drawing Sheets

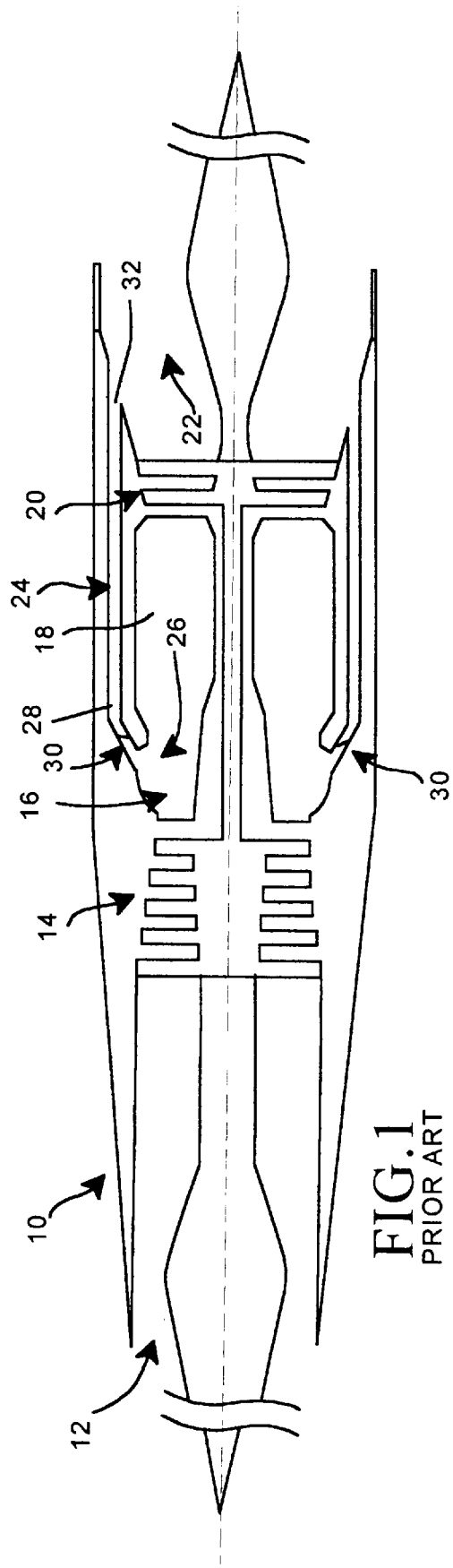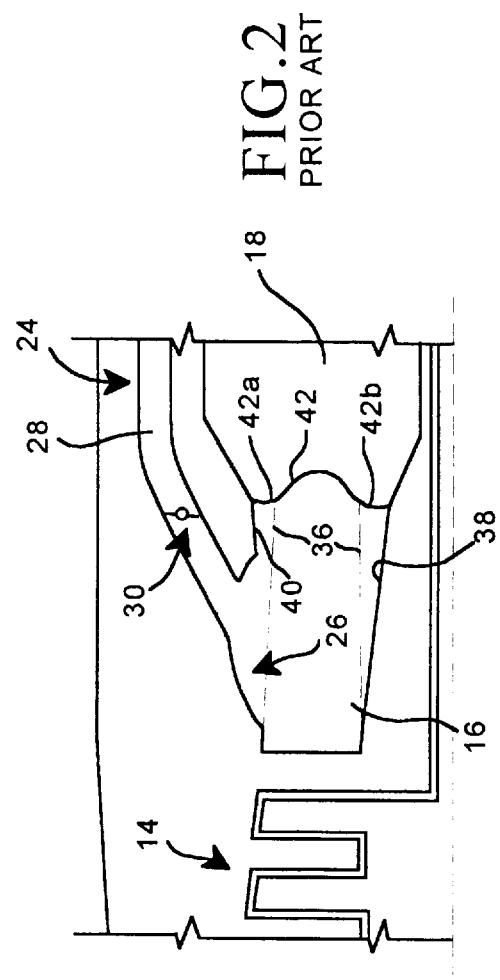
FIG.1 PRIOR ART
FIG.2 PRIOR ART

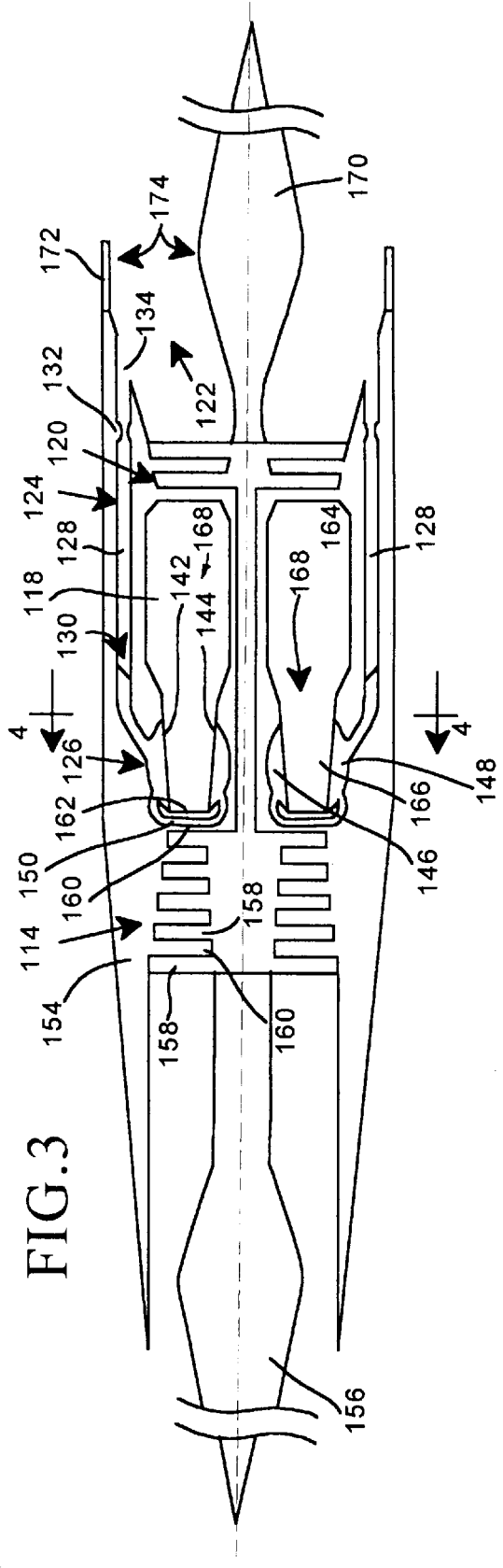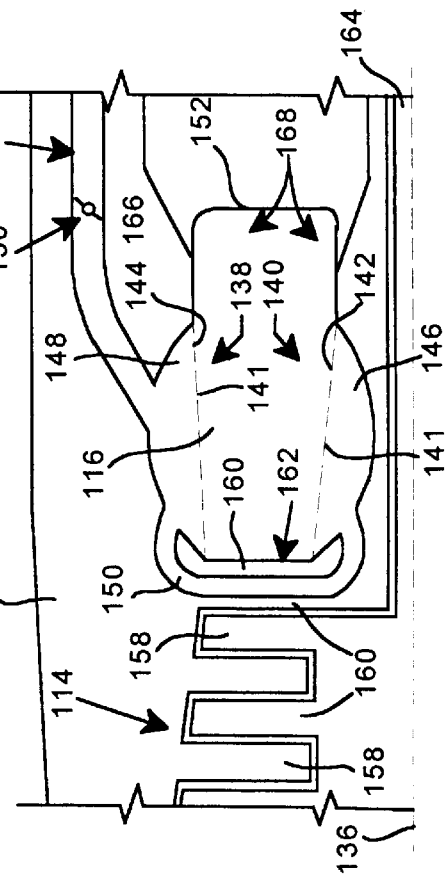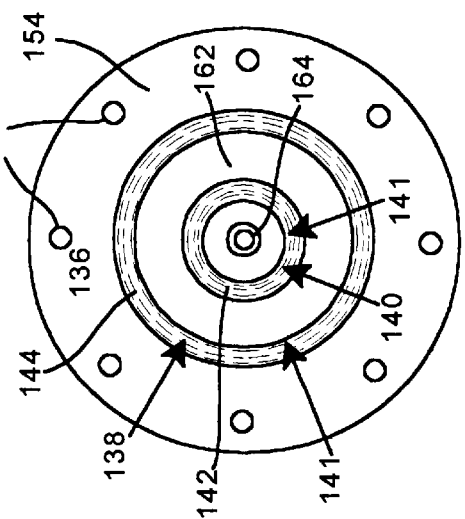

TURBINE BYPASS ENGINES

TECHNICAL FIELD

The present invention relates to turbine engines and, more particularly, to turbine engines having turbine bypass passageways.

BACKGROUND OF THE INVENTION

The requirement has long been felt for an aircraft which is capable of operating effectively in the supersonic range and yet which has the capability of cruising subsonically with relatively low specific fuel consumption (SFC). Military aircraft, for example, must be capable of developing very high thrusts for acceleration and operation in the high supersonic range. Yet for many mission requirements, such as remaining aloft for long periods of time or traveling to and from the areas where the mission is to be carried out, military aircraft must be capable of extended subsonic cruise with low SFC.

Supersonic cruise civilian aircraft such as the High Speed Civil Transport (HSCT) aircraft must also be capable of efficient operation at supersonic cruise. Such aircraft must additionally be capable of operating over densely populated areas at subsonic speeds to avoid the creation of supersonic booms over such areas. These aircraft must thus be capable of operating with low SFC when traveling subsonically.

In general, the operating components of an engine designed for use on such supersonic cruise aircraft are so matched with one another that the engine operates efficiently at supersonic cruise; however, the same matching of engine components does not necessarily lend itself to efficient engine operation at subsonic cruise.

It has been proposed that the operating characteristics of turbine engines operating at subsonic speeds could be improved by providing a bypass passageway for bypassing gaseous flow exiting from the compressor around the turbine to maintain the turbine at or near its optimum operating conditions under off-design conditions. The present invention is particularly applicable to turbojet engines employing turbine bypass, and that application will be discussed in detail below; however, the present invention is generally applicable to any supersonic engine having turbine bypass. Accordingly, the scope of the present invention should be determined based on the appended claims and not the following detailed discussion.

PRIOR ART

An exemplary prior art engine having a turbine bypass passageway is described in U.S. Pat. No. 4,294,068 issued to the present inventor. For convenience, an engine as generally described in that patent is depicted at 10 in FIG. 1 of the attached drawing. The single spool turbojet engine 10 shown in FIG. 1 basically comprises: (a) a supersonic inlet 12; (b) a compressor 14; (c) a diffuser 16; (d) a combustion chamber 18; (e) a turbine 20; (f) a nozzle passageway 22; and (g) a bypass passageway 24. The bypass passageway 24 comprises a bypass inlet 26 and a supply tube means 28 which allow communication between the inlet 26 and the nozzle passageway 22.

At supersonic cruise, the bypass passageway 24 is normally closed by "butterfly" type flow control valves 30 mounted within each of the supply tubes 28. Because the engine components are matched for efficient operation at supersonic cruise without turbine bypass, the engine 10 operates at its best fuel consumption at this point.

When employed on the engine 10 during subsonic cruise and high power settings such as those during aircraft climb and acceleration, the bypass passageway 24 is opened as necessary to operate the engine 10 at higher combustion exit temperatures and maintain constant corrected flow through the turbine 20 to satisfy the turbine requirements. This is accomplished by rotating the flow control valves 30 located within each of the supply tubes 28 as necessary to allow a substantially constant corrected gaseous flow into the turbine 20, even though the total corrected flow through the engine 10 varies. It should be noted that the "butterfly" type control valves are employed in the prior art rather than a variable-throat area nozzle because these "butterfly" type valves are lighter and less complicated than such variable-throat area nozzles.

Additionally, the above-described engine 10 employs a fixed geometry mixer 32 to "dump" mix the turbine bypass flow with the turbine exit flow in the nozzle passageway 22. The dump mixing process is not ideal because it results in a pressure loss due to the large pressure difference between the turbine bypass flow and the turbine exit flow. However, the weight and complexity advantages of a simplified fixed geometry mixer over the fully variable convergent-divergent nozzle required for ideal supersonic mixing have been thought to overcome the slight penalties in thrust and SFC inherent in the dump mixing process.

OBJECTS OF THE INVENTION

From the foregoing, it should be clear that an important object of the present invention is to provide an engine for supersonic cruise aircraft that operates efficiently at both low and high power settings.

Another important, but more specific, object of the present invention is to provide a turbine bypass engine for supersonic cruise aircraft having a favorable mix of the following factors:

a. optimizing the effectiveness of the turbine bypass system;

b. decreasing SFC and increasing thrust over the entire flight envelope;

c. reducing weight and complexity of the engine and supporting apparatus therefor;

d. minimizing the required size of the engine for the critical operating conditions of takeoff and transonic acceleration;

e. using a simple fixed geometry mixer to mix turbine bypass flow with turbine exit flow;

f. supersonically mixing turbine bypass air with turbine exit flow;

g. reducing the pressure difference between the turbine bypass flow and the turbine exit flow;

h. reducing the boundary layer of air flowing within the diffuser;

i. creating substantially uniform static pressure and velocity of the air entering the engine combustion chamber;

j. using simple and inexpensive "butterfly" type valves to control air flow through the turbine bypass system; and k. bypassing the boundary layer of air flowing within the diffuser around the turbine.

SUMMARY OF THE INVENTION

The Applicant has recognized that several inefficiencies are inherent in the design of prior art turbine bypass engines such as the engine 10. First, the Applicant has recognized that, while the simplified fixed geometry dump mixer 32 employed in the engine 10 is generally preferable to a variable convergent-divergent nozzle, the pressure loss caused by the use of the fixed geometry mixer results in an approximately 2–3% penalty in thrust and SFC compared to the ideal supersonic mixing case. This occurs because the turbine bypass air is extracted from the compressor exit at approximately 20 atmospheres and the pressure in the nozzle passageway is typically 4 atmospheres, resulting in the loss during the simplified mixing process of the pressure difference of 16 atmospheres.

Further, these adverse effects on thrust and SFC occur during the critical flight conditions of takeoff and transonic acceleration, which are the flight conditions under which the minimum engine size is determined. Accordingly, the penalties in thrust and SFC caused by the fixed geometry mixer 30 are effectively multiplied by the fact that these penalties result in undesirably increased engine size and weight during subsonic and supersonic cruise.

The Applicant has also recognized that the flow control valves 30 in their partially opened state adversely affect air flowing through the supply pipes 28. More specifically, when these control valves 30 are partially opened, they can accelerate air flowing through the supply pipes 28 to supersonic velocities. This results in large pressure losses and potential flow instabilities in the supply pipes 28.

Additionally, the Applicant has recognized that the boundary layers 36 of air within the diffuser 16 causes an adverse pressure gradient at the juncture between the diffuser 16 and the combustion chamber 18. These boundary layers 36 are lower pressure, lower velocity regions along the inner and outer walls 38 and 40 of the diffuser 16. The boundary layers 36 result in the pressure within the diffuser 16 actually being lower than the pressure within the combustion chamber 16 in certain regions along the exit stage 44 of the diffuser 16, as shown by sections 42a and 42b of the line 42 in FIG. 2. The static pressure and velocity of the air at the diffuser exit stage 44 are thus not uniform.

Accordingly, the Applicant has developed a supersonic aircraft engine comprising: (a) compressor means for compressing inlet air flow; (b) diffuser means for diffusing the air compressed by the compressor means to subsonic velocities; (c) a combustion chamber in which fuel is mixed with the compressed and diffused air and ignited to produce gaseous flow; (d) turbine means impelled by the gaseous flow for powering the compressor; (e) nozzle means for exhausting the turbine exit flow to produce thrust; and (f) turbine bypass means for bypassing a portion of the compressor exit flow around the turbine, the turbine bypass means comprising: (i) means located within the turbine bypass means for controlling the turbine bypass flow; and (ii) fixed geometry means for accelerating the turbine bypass flow to supersonic speeds to produce additional thrust. These fixed geometry flow acceleration means substantially reduce or eliminate the losses caused by mixing subsonic turbine bypass flow with supersonic turbine exit flow, at least for certain critical flight conditions used to determine the minimum size of the engine. Further, a small amount of additional thrust is provided by the fixed geometry flow acceleration means at these critical flight conditions.

Preferably, the turbine bypass means comprises a plurality of supply tubes and the means for controlling turbine bypass flow comprises flow control valves located in each of these supply tubes. To reduce the losses that occur when these flow control valves are in their partially closed positions, certain of these valves are fully closed and the remaining valves are employed to regulate flow through the supply tubes. By fully closing certain of these valves, it is more likely that the remaining tubes may be operated in their fully open state to obtain the desired turbine bypass ratio. The desired turbine bypass ratio may thus be achieved while reducing losses and potential instabilities caused by the flow control valves. At the same time, a relatively simple and inexpensive "butterfly" type valve may be used.

In another embodiment, the present invention comprises: (a) compressor means for compressing inlet air flow; (b) diffuser means for diffusing the air compressed by the compressor means to subsonic velocities; (c) a combustion chamber in which fuel is mixed with the compressed and diffused air and ignited to produce gaseous flow; (d) turbine means impelled by the gaseous flow for powering the compressor; (e) nozzle means for exhausting the turbine exit flow to produce thrust; and (f) turbine bypass means for bypassing a portion of the compressor exit flow around the turbine, the turbine bypass means comprising means for bypassing primarily boundary layer air flowing within the diffuser. By bypassing primarily boundary layer air flowing within the diffuser, the present invention creates a higher pressure with less distortion at the diffuser exit, and it reduces the difference in pressure between the turbine bypass flow and the turbine exit flow.

BRIEF DESCRIPTION OF THE DRAWING

FIG. 1 is a somewhat schematic side cut-away view of the prior art turbine engine having turbine bypass;

FIG. 2 is a somewhat schematic side cut-away view of one-half of the diffuser and a portion of one-half of the compressor and combustion chamber of the prior art engine depicted in FIG. 1 showing the pressure distribution at the exit stage of the diffuser;

FIG. 3 is a somewhat schematic side cut-away view of a turbine engine of a first embodiment of the present invention;

FIG. 4 is an end view of the engine of the present invention taken along lines 4 in FIG. 3;

FIG. 5 is a somewhat schematic side cut-away view of one-half of the diffuser and a portion of one-half of the compressor and combustion chamber of the engine of the present invention depicted in FIG. 3 showing the pressure distribution at the exit stage of the diffuser;

DETAILED DESCRIPTION OF THE PREFERRED EMBODIMENTS

First Embodiment

Figure 6:
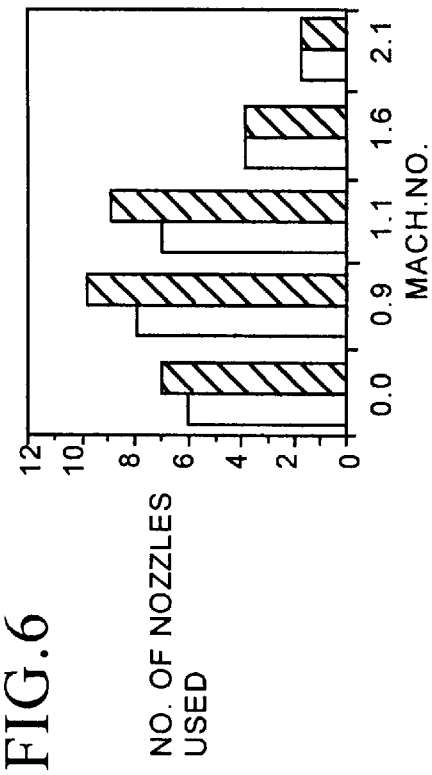
FIG. 6 is a bar chart showing the number of bypass pipes in use during different flight conditions for a typical engine constructed in accordance with the present invention having eight such pipes (solid bars) and a typical engine constructed in accordance with present invention having 10 such pipes (lined bars)

Referring now to the drawing, depicted in FIG. 3 is an engine 110 constructed in accordance with, and embodying, the principles of the present invention. The engine 110 basically comprises: (a) a supersonic inlet 112; (b) a compressor 114; (c) a diffuser 116; (d) a combustion chamber 118; (e) a turbine 120; (f) a nozzle passageway 122; and (g) a bypass passageway 124. The bypass passageway 124 comprises a collector plenum 126 and a series of supply tubes 128 which allow communication between the plenum 126 and the nozzle passageway 122. Located within each of the supply tubes 128 is a "butterfly" type flow control valve 130.

The engine 110 operates in the same basic manner as the engine 10 described above. Specifically, during supersonic cruise, the bypass passageway 124 is closed by flow control valves 130 mounted within each of the supply tubes 128. Because the engine components are matched for efficient operation at supersonic cruise without turbine bypass, the engine 110 operates at relatively low specific fuel consumption with high compression ratio and relatively low combustion exit temperature. However, when employed on the engine 110 during subsonic cruise and high power settings such as those during aircraft climb and acceleration, air is bypassed around the turbine 120 as necessary to operate the engine 110 at higher combustion exit temperatures and maintain constant corrected flow through the turbine 120 to satisfy turbine requirements.

An important feature of the present invention is that a fixed geometry convergent divergent supersonic nozzle 132 is located in each of the supply tubes 128 near the exit openings 134 thereof. These nozzles 132 accelerate the turbine bypass flow to supersonic speeds as the bypass flow leaves the tubes 128. The geometry of these nozzles 132 is optimized for the desired turbine bypass flow at the critical flight condition of transonic acceleration. The turbine bypass flow thus provides additional thrust to the aircraft on which the engine 110 is mounted. The thrust provided by the air flowing through the nozzles 132 substantially eliminates the approximately 2–3% penalty in thrust and specific fuel consumption caused by the prior art turbine bypass system discussed above.

Under off-design conditions, bypass flow through the supply tubes 128 is varied to ensure that the turbine bypass ratio is optimized. This is preferably accomplished by fully closing certain of the supply tubes 128 while regulating the flow of air through others of these tubes 128. More particularly, flow through the tubes 128 can be varied by: (a) fully closing certain of the flow control valves 130 and partially opening the remaining valves 130 as necessary to obtain the required bypass ratio; or (b) providing a sufficient number of supply tubes 128 that the bypass ratio can be optimized by fully closing certain of the flow control valves 130 while fully opening the remaining valves 132.

Preferably, the control valves 130 are either fully open or fully closed, thus avoiding the losses and instabilities associated with partially opening the flow control valves 130. However, weight and complexity considerations will limit the number of supply tubes that can be practically employed and thus the degree of accuracy with which turbine bypass flow can be varied simply by opening or closing the valves 130.

Accordingly, an engine constructed in accordance with the present invention will practically contain, for example, eight or ten such supply tubes. The number and size of the supply tubes 128 employed are so matched with the compressor 114 that the desired turbine bypass flow at transonic acceleration is achieved by fully opening the flow control valves 130. As shown in FIG. 4, the engine 110 comprises eight supply tubes 128 arranged at equally spaced intervals around a center axis 136 (FIG. 4) of the engine 110.

With eight or ten supply tubes, the desired turbine bypass ratio cannot always be achieved by fully opening or closing the flow valves 130, so these valves 130 are sometimes operated in their less efficient partially open condition. Further, the flow through the nozzles 132 may not be optimized for all turbine bypass flow rates. However, the off-design losses introduced by the valves 130 and nozzles 132 are acceptable because these losses are: (a) minimized or eliminated at the critical flight conditions of transonic acceleration, if the supply tubes 128 are properly matched with the other engine components; and (b) are not present during supersonic cruise because no turbine bypass is employed during supersonic cruise.

Another important feature of the present invention is the manner in which the bypass air is withdrawn from the diffuser 116. Ideally, the means by which air is allowed from inside the diffuser into the collector plenum withdraws only boundary layer from within the diffuser. In practice, an annular scoop on or an array of holes in the walls of the diffuser can be provided which allow primarily boundary layer air flowing along the walls of the diffuser to enter the collector plenum.

In the engine 110, as shown in FIGS. 4 and 5, arrays 138 and 140 of holes 141 are provided on the inner and outer walls 144 and 142 of the diffuser 116 to allow communication between the interior of the diffuser 116 and inner and outer portions 146 and 148 of the collector plenum 126. The plenum portions 146 and 148 are in communication with each other through one or more plenum passageways 150. The holes 141 are so placed and dimensioned in these walls 142 and 144 in the arrays 138 and 140 that primarily lower pressure boundary layer air flowing along these walls 142 and 144 is bled or drawn into the plenum portions 146 and 148.

By drawing primarily boundary layer air from within the diffuser 116, the present invention obtains two advantages. First, as shown by line 152 in FIG. 5, the static pressure and velocity of the air entering the combustion chamber 118 is substantially even from the diffuser inner wall 142 to the diffuser outer wall 144 and does not contain the low pressure regions depicted at 42a,b in FIG. 2. Air thus enters the combustion chamber 118 in a much more efficient manner than it does in the prior art engine 10.

Second, by withdrawing primarily lower pressure boundary layer air, the present invention lowers the difference in pressure between the bypass airflow and the turbine exit airflow. Accordingly, any losses introduced by the turbine bypass process are minimized.

While resulting in relatively small performance improvements in thrust and SFC, the improvements of the present invention can be implemented such that the benefits accruing therefrom occur at the critical aircraft operating conditions of transonic acceleration and takeoff. The engine 110 may thus be designed to be slightly smaller and lighter than an engine constructed without the benefits of the present invention. The ability to use a smaller, lighter engine thus extends the benefits of the present invention beyond the conditions in which the turbine bypass system is designed to operate, resulting in an engine that also operates more efficiently at supersonic cruise.

The engine 110 will now be described in greater detail with reference to FIGS. 3–5. In FIGS. 3 and 5, the direction to the left is referred to herein as "upstream" or "forward", while the direction to the right therein is referred to as "downstream" or "aft". The direction extending radially towards the center axis 136 is referred to as "inner, inward", while the direction extending radially away from the center axis 136 is referred to as "outer, outward".

The inlet 112 is an annular passageway formed by an inner surface of an engine housing structure 154 and a forward center body 156. The inlet 112 slightly compresses and decelerates to subsonic speeds the supersonic air entering the engine 110. The center body 156 is translatable along the center axis 136 in a known fashion to vary the geometry of the inlet 112 for different flight conditions. The inlet 112 is wellknown in the art and will not be discussed in further detail herein.

After it has been decelerated and compressed by the inlet 112, the air flowing through the engine 110 enters the compressor 114. The compressor 114 is a multistage compressor comprising a series of alternating rotors 158 and stators 160. The rotors 158 are attached to a shaft 164, which is rotated in a known manner by the turbine 120. The rotors 158 and stators 160 compress the air in a known manner so that the pressure thereof at the compressor exit stage 162 is approximately 20 atmospheres.

Air exiting the compressor 114 enters the diffuser 116 where it is further decelerated. The diffuser 116 comprises an annular chamber 166 bounded by the diffuser inner and outer walls 142 and 144. Ordinarily, a boundary layer of lower pressure and velocity air forms along each of these walls 142 and 144. In the engine 110 constructed in accordance with the present invention, this boundary layer is substantially eliminated by the boundary layer bleed holes 141 arranged in the hole arrays 138 and 140 on the diffuser inner and outer walls 142 and 144.

These holes 141 are so arranged in the walls 142 and 144 that the air bled from the diffuser chamber 166 into the plenum portions 146 and 148 is primarily composed of the lower pressure, lower speed air in the boundary layer. Since the boundary layer is bled off of the diffuser walls 142 and 144, primarily high pressure air enters the combustion chamber 118. Accordingly, as shown by the line 152 in FIG. 5, the static pressure and velocity of the air passing through the exit stage 168 of the diffuser 116 is substantially uniform across this exit stage 168. This uniformity in static pressure and velocity results in more efficient air flow from the diffuser 116 into the combustion chamber 118 and thus lower losses within the engine 110.

Furthermore, bypassing this lower pressure boundary layer air also results in a lower pressure difference between the bypass flow and the turbine exit flow. For example, while the total pressure at the compressor exit stage 162 is 20 atmospheres, the total pressure in the boundary layer is typically 18 atmospheres. Because the bypass flow is primarily composed of boundary layer air, the difference in pressure between the bypass flow and the turbine exit flow is only approximately 14 atmospheres instead of 16 atmospheres. This lower pressure difference reduces the losses introduced by the turbine bypass system.

An important feature of the collector plenum 126 is that it comprises not only the outer portion 148 but the inner portion 146. The inner portion 146 allows the boundary layer to be bled off of the inner wall 142.

As discussed briefly above, the plenum inner portion 146 is connected to the plenum outer portion 148 by a plenum passageway 150. The plenum passageway 150 can be routed between these plenum portions 148 and 146 via any convenient route, but in the engine 110 the passageway 150 extends through the aftmost stators 160.

The above-mentioned flow control valves 130 and nozzles 132 are located in each of the supply tubes 128. In the engine 110 of the first embodiment, the nozzles 132 are located immediately upstream of the supply tube exits 134 so that air leaving the nozzles 132 at supersonic velocities enters the nozzle passageway 122 where it is mixed with the turbine exit flow. The control valves 130 should be located far enough upstream of the nozzles 132 that the valves 130 do not interfere with the flow through the nozzles 132.

The supersonic nozzles 132 in the supply tubes 128 have fixed geometry for simplicity and light weight and are designed to operate most efficiently at a given design point. By appropriately choosing the design point, the benefits provided by the supersonic nozzles 132 result in an off-design improvement in the overall performance of the engine. More particularly, the components of the engine 110 are matched so that the flow control valves 130 are fully open for maximum turbine bypass during transonic acceleration (Mach 0.9 to 1.1). Similarly, the nozzles 132 are designed to operate most efficiently with the flow control valves 130 in their fully open condition during transonic acceleration. Because the flow control valves 130 and nozzles 132 are optimized for transonic acceleration, the thrust increase due to the supersonic nozzles 132 occurs at the point in the flight envelope at which the minimum engine size is determined. Therefore, the size of the engine may be reduced, resulting in lower weight and drag over the entire flight envelope.

At Mach numbers above and below transonic acceleration, certain of the flow control valves 130 are completely closed and the bypass flow is regulated by the remaining control valves 130. This situation is depicted in the graph set forth in FIG. 6. In that graph, the number of supply tubes employed is plotted against Mach number, the number of supply tubes employed by the engine 110 being indicated by solid vertical bars. For comparative purposes, the number of tubes employed by an engine having 10 such supply tubes is also indicated in FIG. 6 by lined bars. Between Mach 0.0 and Mach 0.9, the valves 130 in two of the supply tubes 128 are closed so that turbine bypass air flows through six of these tubes 128. Between Mach 0.9 and Mach 1.1, as discussed above, turbine bypass air flows through all eight supply tubes 128. Between Mach 1.1 and 1.6, seven supply tubes 128 are employed, while between Mach 1.6 and 2.1, six supply tubes 128 are employed. At Mach 2.1, two tubes 128 are employed, and at supersonic cruise, all of the flow control valves 130 are closed.

In any state depicted in FIG. 6 in which certain of the valves 130 are completely closed, the remaining valves 130 are partially opened as necessary to provide the amount of turbine bypass necessary for a given flight condition. In these instances, losses will be introduced in the bypass system by the use of partially opened flow control valves. Furthermore, the geometry of the nozzles 132 may not be optimized for the actual flow through the tubes 128 in these off-design conditions. However, these off-design losses are offset in part by the reduction in engine size discussed above and do not affect the operation of the engine during supersonic cruise when no turbine bypass is employed.

The air that is not bypassed through the bypass passageway 124 enters the combustion chamber 118 where it is mixed with fuel. The mixture of air and fuel is ignited in the chamber 118 to produce a gaseous flow which impels and rotates the turbine 120. As discussed above, the turbine 120 and compressor 114 are connected by the shaft 164 in a well-known manner so that rotation of the turbine 120 causes rotation of the compressor 114.

The turbine exit flow then enters the nozzle passageway 122. This passageway 122 is defined by an aft centerbody 170 and slidable nozzle member 172. The nozzle member 172 is moved forward and rearward to vary an annular nozzle opening 174 as is appropriate for a given flight condition. In the engine 110, the turbine bypass flow is internally mixed with the turbine exit flow in the nozzle passageway 122.

Second Embodiment

Figure 7:
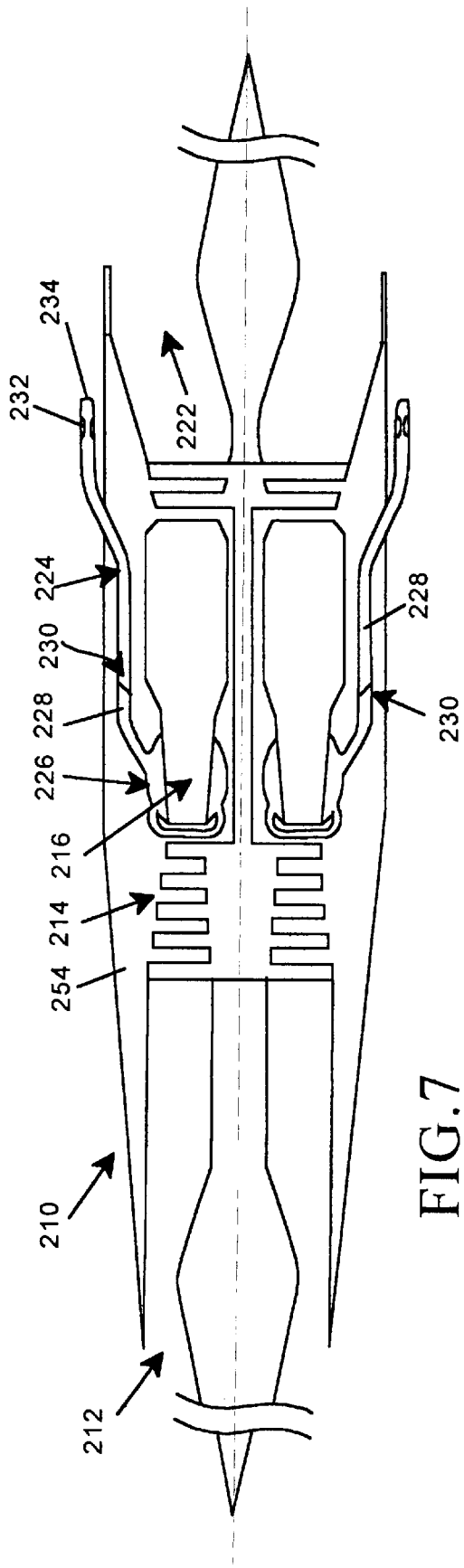
FIG. 7 is a somewhat schematic side cut-away view of a turbine engine of a second embodiment of the present invention.

Depicted in FIG. 7 is an engine 210 constructed in accordance with a second embodiment of the present invention. The engine 210 is constructed and operates in the same basic manner as the engine 110 of the first embodiment and will be discussed below only to the extent that the two engines differ. In the following discussion, elements of the engine 210 which correspond to elements of the engine 110 are assigned reference characters that are equal to the reference characters used in the description of the engine 110 plus one hundred.

The engine 210 basically comprises: (a) a supersonic inlet 212; (b) a compressor 214; (c) a diffuser 216; (d) a combustion chamber 218; (e) a turbine 220; (f) a nozzle passageway 222; and (g) a bypass passageway 224. The bypass passageway 224 comprises a collector plenum 226 and a series of supply tubes 228 which allow communication between the plenum 226 and the nozzle passageway 222. Located within each of the supply tubes 228 is a flow control valve 230. A fixed geometry supersonic nozzle 232 is located in the supply tube 124 near an exit 234 thereof.

The primary difference between the engines 110 and 210 is the placement of the exits of the supply tubes. In the engine 210, the supply tube exits 234 are so arranged that the turbine bypass flow is discharged externally of the engine housing 254. The supply tube exit 234 is preferably arranged in an external base area in which flow can be discharged without suffering a drag penalty when the turbine bypass air is turned off. This arrangement is preferable to the internal mixing process used in the engine 110 and described above if such an external base area exists. If the configuration of the vehicle on which the engine 210 is to be mounted is such that no conveniently accessible base area exists, the drag and weight penalties at supersonic cruise caused by the external tubing are unacceptably large. Accordingly, when no base area as just described exists, it is preferred that the turbine bypass air be internally mixed as disclosed in the discussion of the engine 110 of the first embodiment.

Third Embodiment

Figure 8:
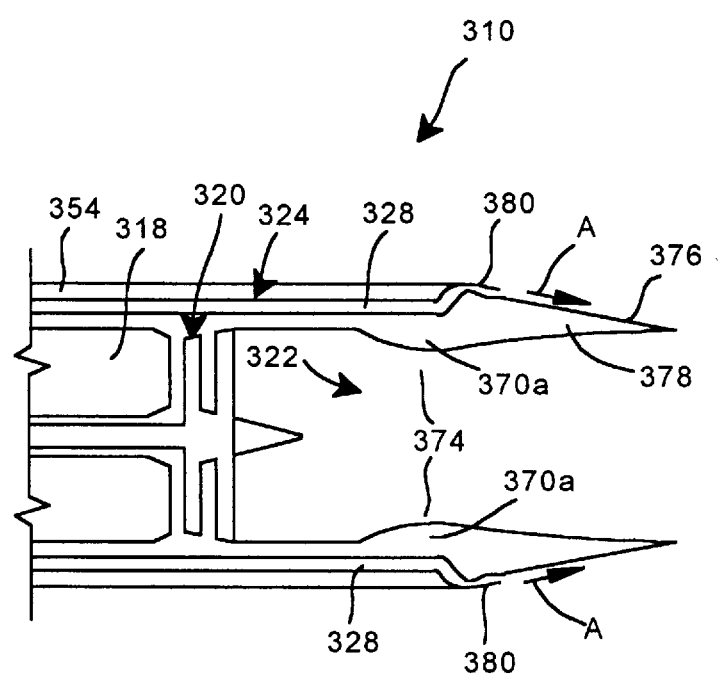
FIG. 8 is a somewhat schematic side cut-away view of an aft portion of a turbine engine constructed in accordance with a third embodiment of the present invention.

Depicted in FIG. 8 is an aft portion of an engine 310 constructed in accordance with a second embodiment of the present invention. The engine 310 is constructed and operates in the same basic manner as engines 110 and 210 described above and only those elements of the engine 310 that differ from the previously-discussed engines will be discussed. In the following discussion, elements of the engine 310 which correspond to elements of the engine 110 are assigned reference characters that are equal to the reference characters used in the description of the engine 110 plus two hundred.

As depicted in FIG. 8, the aft portion of the engine 310 basically comprises: (a) a combustion chamber 318; (b) a turbine 320; (c) a nozzle passageway 222; and (d) a bypass passageway 224. The bypass passageway 224 comprises a series of supply tubes 328 which, as with the engine 210 described above, allow communication between the combustion chamber 318 and the exterior of an engine housing 354. It should also be noted that the engine 310 does not have an aft centerbody. Instead, a nozzle opening 374 is a circular opening formed between a protrusion 370a on the inner surface of the engine housing 354. The nozzle opening 374 functions in essentially the same manner as the nozzle openings 174 and 274 of the engines 110 and 210 described above, and the formation these openings 174, 274, and 374 will be considered equivalent for the purpose of describing the present invention.

The primary difference of the engines 310 and the engines 110 and 210 is the shape and placement of nozzles 332 mounted at the exits 334 of the supply tubes 328. Specifically, in the engine 310, one fixed geometry supersonic nozzle 332 is located in each supply tube 324 near an exit 334 thereof. Further, the supersonic nozzles 332 are slot nozzles so arranged at equally spaced intervals about the periphery of the engine housing 354 that the turbine bypass flow is discharged along an external surface 376 of an aft portion 378 of the engine housing 354 in the direction shown by arrows "A" in FIG. 8.

The exits of these nozzles 332 are arranged in a plane orthogonal to the center axis of the engine 310. Additionally, these nozzles 332 are mounted underneath an extension 380 of the engine housing 354.

By locating the supersonic slot nozzles 232 as described above, the turbine bypass air produces a boundary layer blowing effect that reduces boat-tail drag on the engine 310. Also, because they are mounted under the extension 380, these nozzles 332 do not create excessive drag for conditions in which turbine bypass is not required. This arrangement of slot nozzles 232 may thus be configured to provide acceptable drag when turbine bypass is unnecessary and to provide thrust and reduce boat-tail drag during conditions in which turbine bypass is required.

It should be noted that, as with the engines 110 and 210 described above, the advantages of the arrangement of supersonic nozzles 232 are most strongly felt at the critical takeoff and transonic conditions.

From the foregoing, it should be clear that the present invention may be embodied in forms other than those disclosed above without departing from the spirit or essential characteristics of the present invention. The above-described embodiments are therefore to be considered in all respects illustrative and not restrictive, the scope of the invention being indicated by the appended claims rather than the foregoing description. All changes that come within the meaning and scope of the claims are intended to be embraced therein.

I claim:

1. A supersonic aircraft engine comprising:
   a. compressor means for compressing inlet air flow;
   b. diffuser means for diffusing the air compressed by the compressor means to subsonic velocities;
   c. a combustion chamber in which fuel is mixed with the compressed and diffused air and ignited to produce gaseous flow;
   d. turbine means impelled by the gaseous flow for powering the compressor;
   e. nozzle means for exhausting the turbine exit flow to produce thrust; and
   f. turbine bypass means for bypassing a portion of the compressor exit flow around the turbine, the turbine bypass means comprising means for bypassing primarily boundary layer air flowing within the diffuser, in which:
      i. the diffuser means comprises an annular chamber having inner and outer walls; and
      ii. the means for bypassing boundary layer air bypass boundary layer air flowing over both the inner and outer walls.

2. A supersonic aircraft engine as recited in claim 1, in which the turbine bypass means further comprises a turbine bypass passageway comprising:
   a. means for controlling the turbine bypass flow; and
   b. fixed geometry means for accelerating turbine bypass flow to supersonic speeds to produce thrust.

3. A supersonic aircraft engine as recited in claim 2, in which:

a. the turbine bypass means comprises a plurality of supply tubes; and b. the means for controlling turbine bypass flow comprises flow control valves located in each of the supply tubes; and c. means for operating the flow control valves such that under certain flight conditions certain of these flow control valves are fully closed and the remaining flow control valves are opened only as necessary to obtain a desired rate of turbine bypass flow.

4. A supersonic aircraft engine as recited in claim 3, in which the supply tubes are so matched with the compressor means and turbine means that the desired turbine bypass flow at transonic acceleration is achieved by fully opening all of the flow control valves during transonic acceleration.

5. A supersonic aircraft engine as recited in claim 4, in which the fixed geometry accelerating means are optimized to accelerate the turbine bypass flow to supersonic speeds for the desired turbine bypass flow rate during transonic acceleration.

6. A supersonic aircraft engine comprising:

a. compressor means for compressing inlet air flow;

b. diffuser means for diffusing the air compressed by the compressor means to subsonic velocities;

c. a combustion chamber in which fuel is mixed with the compressed and diffused air and ignited to produce gaseous flow;

d. turbine means impelled by the gaseous flow for powering the compressor;

e. nozzle means for exhausting the turbine exit flow to produce thrust; and f. turbine bypass means for bypassing a portion of the compressor exit flow around the turbine, the turbine bypass means comprising i. means for controlling the turbine bypass flow comprising flow control valves located in each of the supply tubes, ii. fixed geometry means mounted downstream from the control valves in each of the supply tubes for causing the turbine bypass flow to become supersonic to produce thrust, where the fixed geometry means are designed to operate most efficiently with the flow control valves in their fully open position during transonic acceleration.

7. A supersonic aircraft engine as recited in claim 6, in which:

under certain flight conditions, certain of the flow control valves are fully closed and the remaining flow control valves are opened as necessary to obtain a desired rate of turbine bypass flow.

8. A supersonic aircraft engine as recited in claim 7, in which the supply tubes are so matched with the compressor means and turbine means that the desired turbine bypass flow at transonic acceleration is achieved by fully opening all of the flow control valves during transonic acceleration.

9. A supersonic aircraft engine as recited in claim 8, in which the fixed geometry accelerating means are optimized to accelerate the turbine bypass flow to supersonic speeds for the desired turbine bypass flow rate during transonic acceleration.

10. A supersonic aircraft engine as recited in claim 6, in which the turbine bypass means further comprises means for bypassing primarily boundary layer air flowing within the diffuser.

11. A supersonic aircraft engine as recited in claim 6, in which the fixed geometry means are so mounted that the turbine bypass air exiting therefrom produces a boundary layer blowing effect that reduces drag on the engine.

12. A supersonic aircraft engine comprising:

a. compressor means for compressing inlet air flow;

b. diffuser means for diffusing the air compressed by the compressor means to subsonic velocities, the diffuser means comprising an annular chamber having inner and outer walls;

c. a combustion chamber in which fuel is mixed with the compressed and diffused air and ignited to produce gaseous flow;

d. turbine means impelled by the gaseous flow for powering the compressor;

e. nozzle means for exhausting the turbine exit flow to produce thrust; and f. turbine bypass means for bypassing a portion of the compressor exit flow around the turbine, the turbine bypass means comprising means for bypassing primarily boundary layer air flowing within the diffuser, where the means for bypassing boundary layer air bypasses boundary layer air flowing over both the inner and outer walls.

13. A supersonic aircraft engine comprising:

a. compressor means for compressing inlet air flow;

b. diffuser means for diffusing the air compressed by the compressor means to subsonic velocities;

c. a combustion chamber in which fuel is mixed with the compressed and diffused air and ignited to produce gaseous flow;

d. turbine means impelled by the gaseous flow for powering the compressor;

e. nozzle means for exhausting the turbine exit flow to produce thrust; and f. turbine bypass means for bypassing a portion of the compressor exit flow around the turbine, the turbine bypass means comprising:

i. a plurality of supply tubes; and ii. flow control valves located in each of the supply tubes, where, under certain flight conditions, certain of these flow control valves are fully closed and certain of the remaining flow control valves are fully opened as necessary to obtain a desired rate of turbine bypass flow.

14. A supersonic aircraft engine, comprising a. compressor means for compressing inlet air flow;

b. diffuser means for diffusing the air compressed by the compressor means to subsonic velocities;

c. a combustion chamber in which fuel is mixed with the compressed and diffused air and ignited to produce gaseous flow;

d. turbine means impelled by the gaseous flow for powering the compressor;

e. nozzle means for exhausting the turbine exit flow to produce thrust; and f. turbine bypass means for bypassing a portion of the compressor exit flow around the turbine, the turbine bypass means comprising means for bypassing primarily boundary layer air flowing within the diffuser, wherein g. the turbine bypass means further comprises a turbine bypass passageway comprising
   i. means for controlling the turbine bypass flow; and
   ii. fixed geometry means for accelerating turbine bypass flow to supersonic speeds to produce thrust;

h. the turbine bypass means comprises a plurality of supply tubes;

i. the means for controlling turbine bypass flow comprises flow control valves located in each of the supply tubes; and further comprising j. means for operating the flow control valves such that under certain flight conditions certain of these flow control valves are fully closed and the remaining flow control valves are opened only as necessary to obtain a desired rate of turbine bypass flow.

* * * * *